United States Patent [19]
Ludwig, Jr.

[11] 3,780,613
[45] Dec. 25, 1973

[54] BASS DRUM SUSPENSION
[75] Inventor: William F. Ludwig, Jr., Oak Brook, Ill.
[73] Assignee: Ludwig Industries, Chicago, Ill.
[22] Filed: Apr. 16, 1973
[21] Appl. No.: 351,295

[52] U.S. Cl. .................................................. 84/421
[51] Int. Cl. ............................................ G10d 13/02
[58] Field of Search ..................... 84/411, 421, 422; 206/13

[56] References Cited
UNITED STATES PATENTS
3,185,013  5/1965  Gussak ............................ 84/421 X
3,191,484  6/1965  Walling ............................ 84/421

OTHER PUBLICATIONS
Ludwig Catalog No. 64, 1964, page 72.

*Primary Examiner*—Lawrence R. Franklin
*Attorney*—W. Melville Van Sciver

[57] ABSTRACT

A suspension for a bass drum which is resilient and which prevents unwanted transmissions of vibrations from the beating of the drum to the supporting stand thus eliminating rattles and the like. Each suspension includes a flexible cord having a coiled spring at each end thereof which springs are removable secured to a ring supporting member with the cord slidably passing through an eye provided on the drum shell.

5 Claims, 3 Drawing Figures

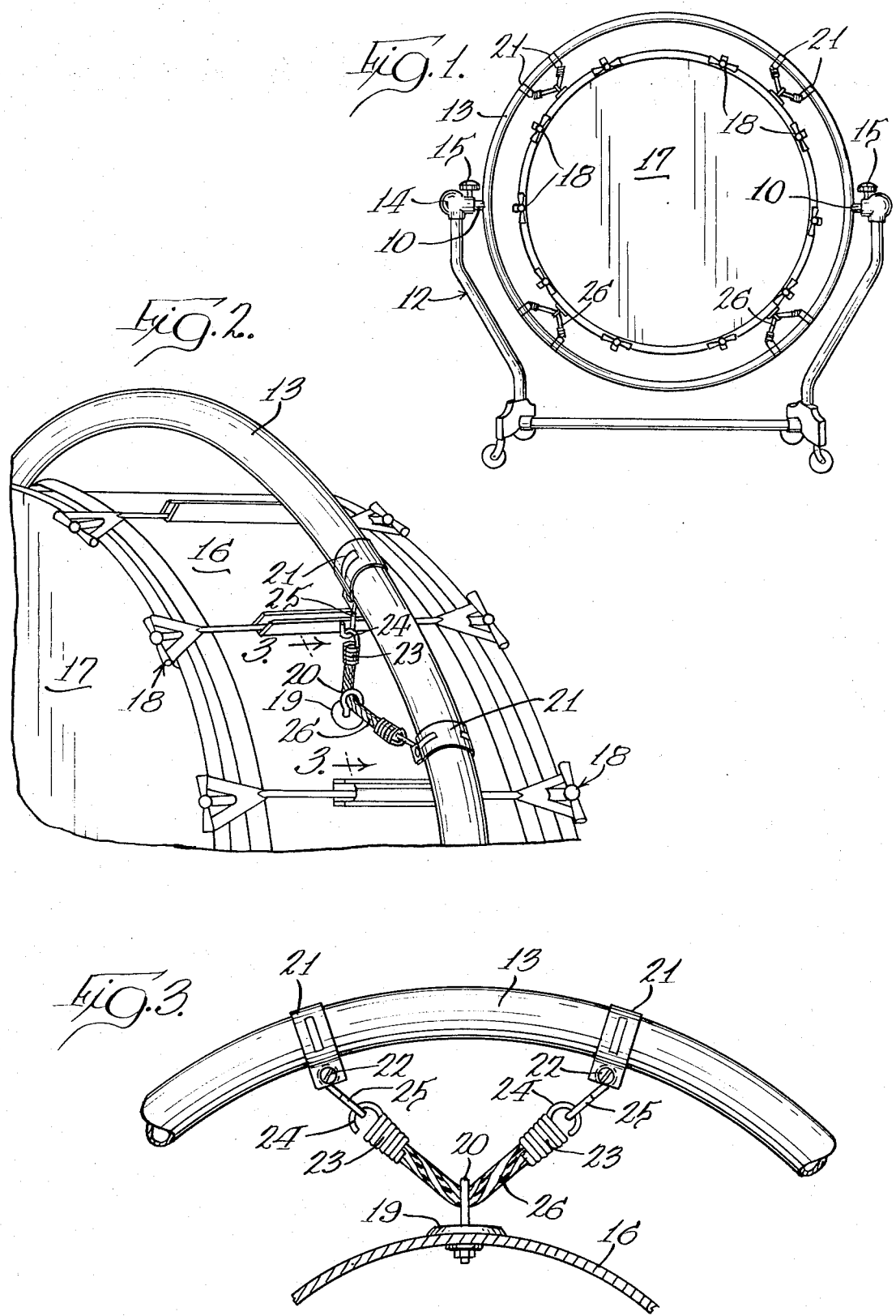

BASS DRUM SUSPENSION

BACKGROUND OF THE INVENTION

1. Field of the Invention

The invention relates to suspension for bass drums.

2. Description of the Prior Art

In the prior art bass drums have been suspended from stands by various resilient supports. However, unwanted vibrations have been transmitted through the supports to the supporting structure which has produced undesirable rattles.

SUMMARY OF THE INVENTION

The present invention provides a new and improved suspension for bass drums and the like in which vibrations which may cause rattle and undesirable noises are effectively dampened.

BRIEF DESCRIPTION OF THE DRAWINGS

FIG. 1 is an elevational view of the bass drum suspension embodying the invention;

FIG. 2 is a partial perspective view of the bass drum suspension shown in FIG. 1; and FIG. 3 is an enlarged view of an individual suspension such as shown in FIG. 1.

DESCRIPTION OF THE PREFERRED EMBODIMENT

Referring to the drawings, numeral 11 designates generally a bass drum for use in providing musical drum sounds when played by a drummer using beaters, mallets or the like. The drum 11 may be supported on a portable stand generally indicated at 12 which in turn supports a circular tubular member 13 which is of larger diameter than the drum 11. The ring 13 is supported at opposite sides by bearings 10 which are rotatably embedded in bearing members 14. Clamping screws 15 are provided to position the ring 13 and the bass drum 11 in any desired playing position.

The drum 11 includes a shell 16 and drum heads 17 which heads 17 are secured to the drum 16 by well-known tensioning members 18.

A number of grommets 19 are secured to the shell 16 and a hook 20 is secured to each grommet and extends outwardly from the shell 16. Each supporting member includes a pair of readily removable clamps 21 which clamps are tightened on the ring 13 by screw members 22. Coil springs 23 are attached by pressure to opposite ends of rsilient cord 26 which cord passes through the hook 20. The outward end of the springs 23 are provided with hooks 24 which engage with hooks 25 which are secured to the clamps 21 by the screws 22. Preferably four of the supports are provided around the periphery of the drum 11 as shown in FIG. 1 although more may be used if desirable.

When the drum is beaten by a player, the vibrations from the head 17 are transmitted to the shell 16, but very little vibration is transmitted to the support 12 through the flexible cord 26 and the coiled springs 23 thus eliminating rattles and unwanted vibrations from the drum to the supporting member.

What is claimed is:

1. In a musical instrument comprising a generally cylindrical shaped drum having at least one head, a drum stand for supporting the drum including a member surrounding the drum and spaced laterally therefrom and means for suspending the drum from said member, said means comprising an eye-shaped member secured to the drum, and elastic and flexible cord adapted to pass through said eye member, a pair of springs secured to opposite ends of the flexible cord and a pair of fastening means securing the respective springs to the supporting member in spaced relation thereon.

2. The apparatus set forth in claim 1 wherein said fastening members comprise readily removable clamps secured to the supporting member and the springs.

3. The apparatus set forth in claim 1 wherein said supporting member is in the form of a ring.

4. The apparatus claimed in claim 1 wherein said suspension means are spaced peripherally of the supporting member.

5. The apparatus claimed in claim 1 wherein said suspension means are spaced at four substantially equidistant positions on the supporting member.

* * * * *